US012573305B2

(12) United States Patent
Whitmarsh et al.

(10) Patent No.: US 12,573,305 B2
(45) Date of Patent: Mar. 10, 2026

(54) ARTIFICIALLY INTELLIGENT SKYWAY

(71) Applicant: Tradewinds Technology, LLC,
Carlsbad, CA (US)

(72) Inventors: Peter David Whitmarsh, Carlsbad, CA
(US); Shana Whitmarsh, Carlsbad, CA
(US)

(73) Assignee: Tradewinds Technology, LLC,
Carlsbad, CA (US)

( * ) Notice: Subject to any disclaimer, the term of this
patent is extended or adjusted under 35
U.S.C. 154(b) by 69 days.

(21) Appl. No.: 18/630,162

(22) Filed: Apr. 9, 2024

(65) Prior Publication Data

US 2024/0257646 A1      Aug. 1, 2024

Related U.S. Application Data

(63) Continuation of application No. 17/476,464, filed on
Sep. 15, 2021, now Pat. No. 11,995,992.

(60) Provisional application No. 62/706,882, filed on Sep.
15, 2020.

(51) Int. Cl.
*G08G 5/26*      (2025.01)
*G08G 5/00*      (2006.01)
*H04L 9/30*      (2006.01)
*H04L 67/12*      (2022.01)

(52) U.S. Cl.
CPC ................ *G08G 5/26* (2025.01); *G08G 5/00*
(2013.01); *H04L 9/30* (2013.01); *H04L 67/12*
(2013.01)

(58) Field of Classification Search
CPC ... G08G 5/26; G08G 5/00; H04L 9/30; H04L
67/12
See application file for complete search history.

(56) References Cited

U.S. PATENT DOCUMENTS

| | | | |
|---|---|---|---|
| 9,085,362 | B1 | 7/2015 | Kilian et al. |
| 9,087,451 | B1 | 7/2015 | Jarrell |
| 11,022,407 | B2 | 6/2021 | Whitmarsh et al. |
| 2004/0249519 | A1 | 12/2004 | Frink |
| 2008/0088508 | A1 | 4/2008 | Smith |
| 2010/0085236 | A1 | 4/2010 | Franceschini et al. |
| 2014/0213176 | A1 | 7/2014 | Mendelson |
| 2015/0254988 | A1 | 9/2015 | Wang et al. |
| 2015/0323930 | A1 | 11/2015 | Downey et al. |
| 2015/0350914 | A1 | 12/2015 | Baxley et al. |
| 2016/0245907 | A1 | 8/2016 | Parker et al. |
| 2017/0069214 | A1 | 3/2017 | Dupray et al. |

(Continued)

*Primary Examiner* — Vivek D Koppikar
*Assistant Examiner* — Jeffrey R Chalhoub
(74) *Attorney, Agent, or Firm* — TraskBritt

(57) ABSTRACT
An artificially intelligent air traffic control system is pro-
vided. The system can include an artificially intelligent (AI)
sensor configured to detect and remotely communicate with
one or more flying vehicles and an AI local server commu-
nicatively coupled to the AI sensor. The artificially intelli-
gent local server can send control instructions including
authorization for the one or more flying vehicles to fly in an
airspace and a flight path to fly through the airspace. The
system can also include an AI cloud server communicatively
coupled to the AI local server. The AI cloud server can
receive data from the AI local server and the AI sensor
associated with the one or more flying vehicles. The AI local
server can send the authorization and the flight path to the
one or more flying vehicles via the AI sensor based on the
received data stored on the AI cloud server.

14 Claims, 4 Drawing Sheets

(56) References Cited

U.S. PATENT DOCUMENTS

| | | | |
|---|---|---|---|
| 2017/0192089 A1 | 7/2017 | Parker et al. | |
| 2018/0164080 A1 | 6/2018 | Chi-Hsueh | |
| 2018/0208326 A1 | 7/2018 | Sander et al. | |
| 2019/0173605 A1 | 6/2019 | Morrow et al. | |
| 2019/0251850 A1* | 8/2019 | Stewart | B64U 10/00 |
| 2019/0375503 A1* | 12/2019 | Maxwell | G07C 5/008 |
| 2021/0302621 A1* | 9/2021 | Brown | H04Q 9/00 |

* cited by examiner

320

430

ARTIFICIALLY INTELLIGENT SKYWAY

CROSS-REFERENCE TO RELATED APPLICATIONS

This application is a continuation of U.S. patent application Ser. No. 17/476,464, filed Sep. 15, 2021, now U.S. Pat. No. 11,995,992, issued May 28, 2024, which claims priority to U.S. Provisional patent application Ser. No. 62/706,882, which was filed on Sep. 15, 2020, the contents of each of which are hereby incorporated by reference.

BACKGROUND

There has been increased interest in the use of flying vehicles for a variety of applications. For example, while many enthusiasts currently enjoy piloting unmanned aerial vehicles (commonly referred to as drones), ideas and interest for more widespread use of such flying vehicles grows. Such flying vehicles might include flying cars, heavy transport drones, medical flying robots, and other next generation aircraft. Some project that these flying vehicles will have applications in the future to aid in the delivery of packages to their final destinations from a warehouse or other location. Autonomous air taxis to transport people or autonomous air delivery to deliver goods within a neighborhood or city are also being envisioned.

This projected increase in air traffic in addition to legacy aircraft already in use has the potential to cause congestion in an airspace, especially in densely populated areas. Furthermore, while the proliferation of new flying vehicles promises to bring many benefits, such flying vehicles also have the potential to be used to cause physical harm and property damage.

BRIEF SUMMARY

Based on the foregoing, it will be necessary to identify, authorize and control traffic through an airspace, especially in congested airspace where many varieties of flying vehicles will need to operate simultaneously. Furthermore, it is also important to be able to restrict access to unauthorized flying vehicles and to protect people and property from potentially hazardous flying vehicles.

According to the present disclosure, an artificially intelligent air traffic control system is provided. The system can comprise an artificially intelligent sensor configured to detect and remotely communicate with one or more flying vehicles, and an artificially intelligent local server communicatively coupled to the artificially intelligent sensor. The artificially intelligent local server can send control instructions comprising authorization for the one or more flying vehicles to fly in an airspace monitored by the artificially intelligent air traffic control system and a flight path assigned to the one or more flying vehicles to fly through the airspace.

The system can further comprise an artificially intelligent cloud server communicatively coupled to the artificially intelligent local server. The artificially intelligent cloud server can be configured to receive data from the artificially intelligent local server and the artificially intelligent sensor associated with the one or more flying vehicles. The artificially intelligent local server can send the authorization and the flight path to the one or more flying vehicles via the artificially intelligent sensor based on the received data stored on the artificially intelligent cloud server.

In some examples, the artificially intelligent cloud server can be one of a plurality of artificially intelligent cloud servers. The artificially intelligent cloud servers can comprise a decentralized network wherein each artificially intelligent cloud server can comprise a blockchain node with a registry of public identification information associated with the one or more flying vehicles. The system can further comprise an AI SIM card assigned to each of the one or more flying vehicles. The AI SIM card can comprise private identification information corresponding to the assigned flying vehicle.

The private identification information can comprise a digital wallet having a private key. The private identification information can be verified based on a public key associated with the public identification information. Authorization of the flying vehicle can be based on the verification of the private identification information with the public identification information. The AI local server can be operable to perform the verification based on the public identification information stored on the registry.

In some examples, the system can also comprise an e-commerce system operable to facilitate a transaction with the one or flying vehicles to obtain the authorization to fly in the airspace. In some examples, the artificially intelligent sensor can comprise a sensor module comprising a Wi-Fi network activity sensor, radar, infrared sensor, or a radio sensor to detect the one or more flying vehicles in or around the airspace. The artificially intelligent sensor can comprise a communication module operable to send control instructions to the one or more flying vehicles to assume control the one or more flying vehicles as the one or more flying vehicles fly through the airspace.

In another example of the present disclosure, a method for controlling an airspace is provided. The method can include detecting a flying vehicle in or around an airspace via an artificially intelligent ("AI") sensor, including detecting identification information associated with the flying vehicle and communicating the identification information to an AI local server communicatively coupled to the AI sensor. The method can further comprise determining an authorization status of the flying vehicle at the AI local server based on data stored at an AI cloud server associated with the flying vehicle. The AI local server can be communicatively coupled to the AI cloud server.

When an authorization status of the flying vehicle is determined to be unauthorized, a flight path through an air space can be assigned to the flying vehicle at the AI local server and the flight path can be communicated to the flying vehicle via the AI sensor. When the authorization status of the flying vehicle is determined to be unauthorized, access of the flying vehicle to the air space can be restricted.

In some examples, the flight path can comprise a series of waypoints through the airspace. In some examples, assigning a flight path can comprise sending control instructions from the AI sensor to control the flying vehicle as it travels through the airspace.

In some examples, when the authorization status is determined to be unauthorized, a transaction can be conducted with the flying vehicle via an e-commerce system to authorize the flying vehicle to fly through the airspace. In other examples, when the authorization status is determined to be unauthorized, control of the flying vehicle can be commandeered via control instructions sent by the AI sensor, and the flying vehicle can be automatically piloted to a holding area.

In some examples, the AI cloud server is one of a plurality of AI cloud servers. The AI cloud servers can comprise a decentralized network wherein each AI cloud server comprises a blockchain node. The data stored at the AI cloud server can comprise a registry of public identification information associated with the flying vehicle. An AI SIM card can be assigned to flying vehicle where the AI SIM card can comprise private identification information corresponding to the assigned flying vehicle.

The private identification information can comprise a digital wallet having a private key. The private identification information can be verified based on a public key associated with the public identification information. The authorization status can be based on the verification of the private identification information with the public identification information. The AI local server can be operable to perform the verification based on the public identification information stored on the registry.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Figure 1:
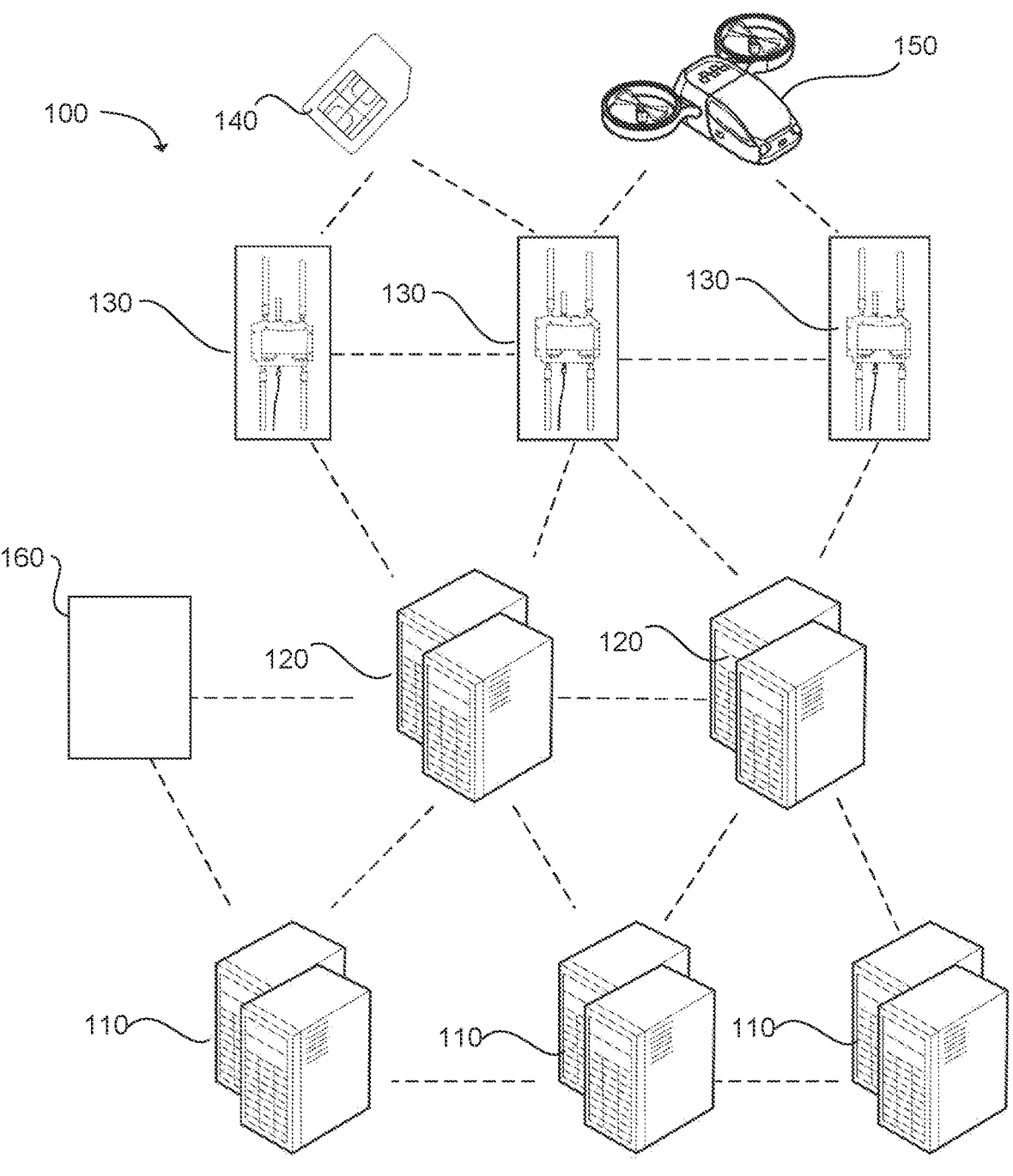
FIG. 1 is a schematic view of an artificially intelligent air traffic management system in accordance with an embodiment of the present invention.

According to the present disclosure, an artificially intelligent air traffic management system ("AITMS") is provided. The AITMS is configured to authorize entry or reject entry of flying vehicles into one or more airspaces monitored by the AITMS and to ensure safe flight of the flying vehicles through the airspace monitored by the AITMS. As illustrated in FIG. 1, an artificially intelligent air traffic management system, indicated generally at 100, can comprise several features. The AITMS 100 can comprise a plurality of artificially intelligent ("AI") cloud servers 110. The AI cloud servers 110 can serve as an information repository for the entire AITMS system 100 and include a plurality of hardware and/or software modules to control authorization into the airspace(s) and to direct traffic of flying vehicles 150 through the airspace(s).

The AITMS 100 can further comprise a plurality of AI local severs 120. The AI local servers 120 can be communicatively coupled to the AI cloud servers 110. For example, the AI local servers 120 can be connected to the AI cloud servers 110 via a networked connection such as a wired or wireless network. The AI local servers 120 can relay information from the AI cloud server 110 to an AI sensor 130 (which can be part of an array of AI sensors) and from the AI sensor 130 to the AI cloud server 110. Additionally, the AI local servers 120 can comprise one or more hardware/software/firmware modules to locally control authorization and to locally direct traffic of flying vehicles 150 through the airspace or through a portion of the airspace.

As mentioned above, the AITMS 100 can further comprise a plurality of AI sensors 130. The AI sensors 130 are configured to detect flying vehicles 150 within an airspace monitored by the AITMS 100 and within a vicinity of the airspace monitored by the AITMS 100. The AI sensors 130 are further configured to communicate with the detected flying vehicles 150 such as to obtain identification information from the detected flying vehicles 150, to send flight path instructions to the detected flying vehicles 150, to control the flight of the detected flying vehicles 150, and to otherwise relay information from the flying vehicles 150 to the AI local server 120 and the AI cloud server 110. The AI sensors 130 can be configured as an array of AI sensors and can be placed strategically in the airspace and outside of the airspace as needed. The AI sensor 130 can be connected to the AI local servers 120 via a networked connection such as a wired or wireless network.

The AITMS 100 can also comprise other components. For example, the AITMS 100 can comprise an AI subscriber identity module ("SIM") card 140. An AI SIM card 140 can be installed on each of the flying vehicles 150 and can comprise identifying information regarding the flying vehicle 150. For example, the AI SIM card 140 can comprise a type of flying vehicle, control information regarding the flying vehicle, subscription information including whether a flying vehicle is currently authorized to fly into an airspace, and the like.

The AITMS 100 can further comprise an e-commerce system 160. The e-commerce system 160 can be a separate system from the AI local servers 120 and the AI cloud server 110, or the e-commerce system 160 can be integrated into the servers 110, 120. In some examples, the e-commerce system 160 can facilitate transactions in crypto currency, and can be termed a crypto-commerce system. In some instances, the e-commerce system 160 can be a third-party system used to process e-commerce transactions for the AITMS 100. The e-commerce system 160 is configured to process payments and other transactions between flying vehicles 150 and the AITMS 100, such as for a flying vehicle 150 to purchase entry into an airspace controlled by the AITMS 100.

Figure 2:
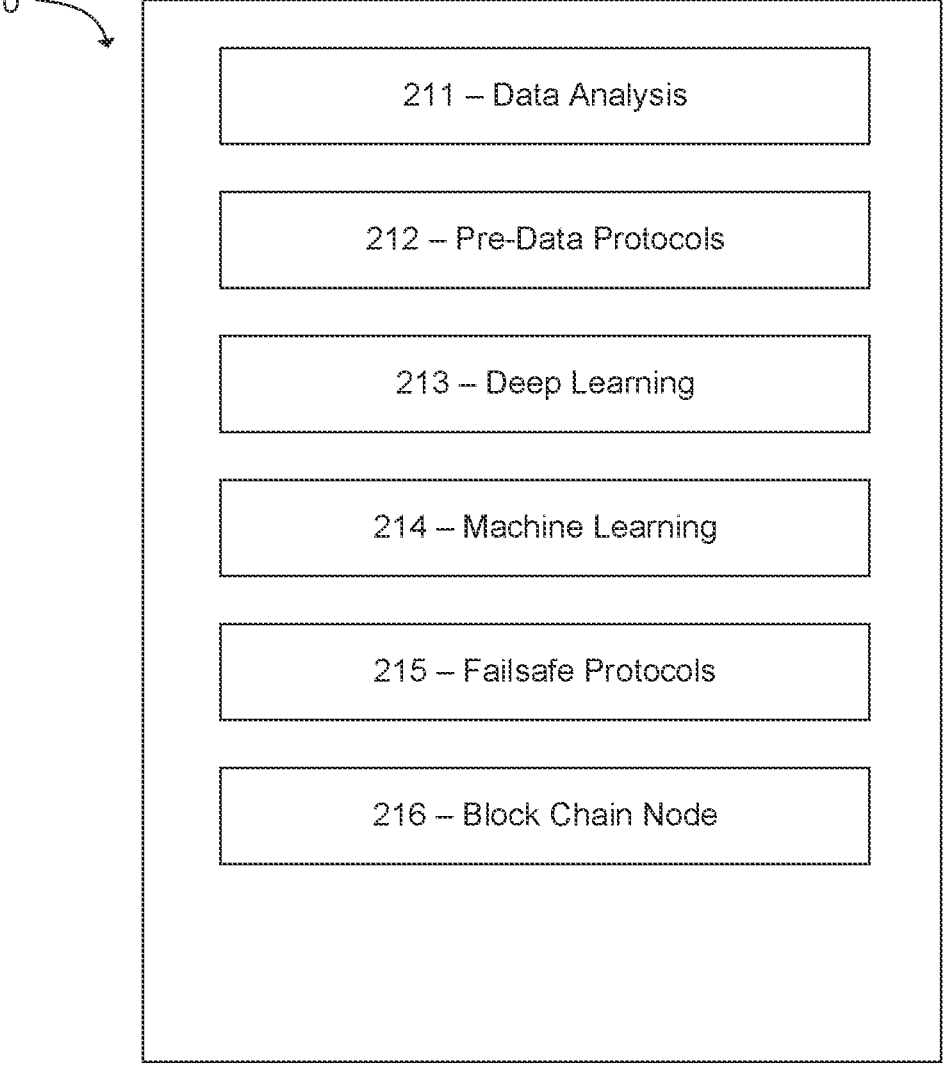
FIG. 2 is a schematic view of an artificially intelligent cloud server of the artificially intelligent air traffic management system shown in FIG. 1.

As mentioned above, each of the AI cloud servers 110 and the AI local servers 120 can comprise hardware/software modules to aid in the control of the AITMS 100. FIG. 2 shows a schematic of an AI cloud server, indicated generally as 210. The AI cloud sever 210 shown in FIG. 2 is an example of one or more of the AI cloud servers 110 of the AITMS 100. The AI cloud server 210 can comprise several hardware/software modules to control the AITMS 100.

For example, the AI cloud server 210 can comprise a data analysis module 211. The data analysis module 211 can be configured to process data received in real time and compartmentalize the data into different sections of the artificial intelligence of the AI cloud server 210. Further, the data analysis module 211 can register authorizations and entries occurring on a dedicated closed-loop internal network blockchain. The AI cloud server 210 can receive data from the AI local servers and the AI sensors regarding all events that take place in the AITMS. For example, the data can include flying vehicles detected in the vicinity of an airspace, flying vehicles detected within an airspace, flight paths taken through an air space, vehicle identification of a flying vehicle, and the like. The data analysis module 211 can further analyze all raw data that has been compartmented into different actions. These actions can be stored to be retrieved by the AI cloud server 210 to develop, program, train, encode, and decode actions for future scenarios encountered by the AI cloud server 210.

The AI cloud server 210 can further comprise a pre-data protocol module 212. The pre-data protocol module 212 can be configured to anticipate the traffic environment events by translating how air traffic can ebb and flow. The pre-data protocols can anticipate risk possibilities to prevent congestion or collisions.

The AI cloud server 210 can further comprise a deep learning module 213. The deep learning module 213 uses the data stored by the data analysis module 211 to aid in the teaching of various components of the AITMS 100, such as developing algorithms to respond to events encountered by the various components of the AITMS 100. Such algorithms can be stored and applied to the AI cloud server 110, 210, the AI local server 120, the AI sensors 130, and/or the AI SIM card. The deep learning module can be configured to filter data received from or about the flying vehicles 150 along with environment data inputs through layers in learning how to predict and classify information.

The AI cloud server 210 can further comprise a machine learning module 214. The machine learning module 214 is configured to process algorithms that were introduced as a training database or were improved upon automatically from experiences of events that were encountered on the AITMS 100. The AI cloud server 210 can comprise "time pill short scripts" that are able to be triggered by multi-machine learning processes in creating solutions from short scripts that are applied as future commands, controls, or system resolution. The "short pill scripts" are triggered by a clock/calendar updates, and they apply the new solution to the entire network of the AITMS 100. These time pill short scripts produce and maintain software libraries that manage failsafe protocols and command protocols. As the AITMS 100 learns of new problems, it self-sets its own triggers to run its own analytical analysis section in the processing of big data creating new solutions to new situations in the airspace. The constant big data flow is processed through the AI Local Server Machine Learning section (fig). This self-processing and self-development create instant self-solution applications to answer those problems.

The AI cloud server 210 can further comprise a failsafe protocols module 215. The failsafe protocols module can comprise predictive analysis using a variety of statistical techniques from data mining information on various types of flying vehicles and predictive modeling of collisions and clear flight paths. The failsafe protocols modules 215 can analyze current and past events to make predictions about the future or otherwise unknown traffic risks and environmental risks. Such events can include when a flying vehicle commits an illegal action such as flying outside a given flight path, entering an airspace without authorization, or the like. The failsafe protocols can define corrective actions and solutions to ensure safe travel of all flying vehicles through the airspace.

The AI cloud server 210 can further comprise a blockchain node 216. In one example, the blockchain node 216 is one of a plurality of nodes in a decentralized network of AI cloud severs 110 (see FIG. 1). The blockchain nodes facilitate a blockchain in decentralizing multiple digital flying vehicles registry records corresponding to the unique digital signature values of each flying vehicle stored within a digital wallet of its AI SIM card 140. The AI cloud servers can make this information available to the entire network of the AITMS. The blockchain node 216 can verify flight access or authorization in batches within the network of the AITMS 100. These batches can be termed "Flight-Blocks." The AI cloud server 210 can be one server of a plurality of decentralized AI cloud servers (such as cloud servers 110 shown in FIG. 1). Events, data, aircraft identities, etc., (i.e., public identification information) can be stored on a distributed registry or ledger maintained by each of the AI cloud servers 110, 210. For example, an identity of a particular flying vehicle 150 (see FIG. 1) can be confirmed based on private identification information such as a signature code value sent from an AI SIM card 140 of the flying vehicle 150 (e.g., a private key stored in a digital wallet of the AI SIM card 140) to an AI local server 120. The signature code value can be verified by the AI local server 120 based on the registry or ledger of public identification information maintained by the AI cloud sever 210 to determine an authorization status of the flying vehicle and to tie data associated with events regarding the flying vehicle 150 (e.g., via a public key stored in in the distributed ledger of the blockchain).

As mentioned above, the AI cloud server 110, 210 communicates with the AI local servers 120 and the AI sensors 130 to receive data and to communicate control instructions for use in the AITMS 100. The AI clouds server 110, 210 can be configured to control a single airspace or can be configured to control multiple different airspaces. The decentralized nature of multiple AI cloud servers 110, 210 allows data received in one airspace to be incorporated into that of another airspace. Thus, the AITMS 100 can apply lessons learned from events in one airspace to events in another airspace.

Figure 3:
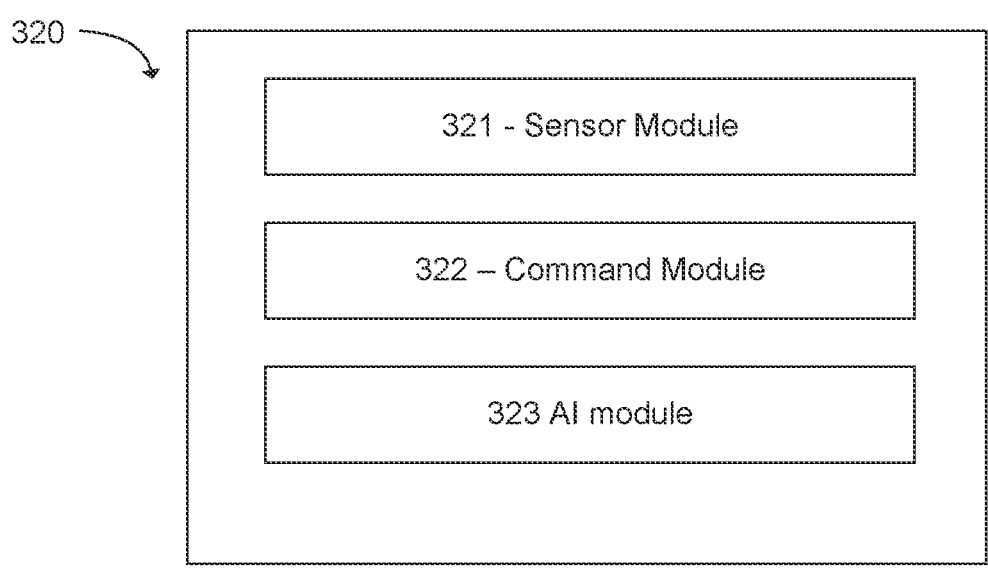
FIG. 3 is a schematic view of an artificially intelligent local server of the artificially intelligent air traffic management system shown in FIG. 1.

FIG. 3 shows a schematic of an AI local server, indicated generally as 320. The AI local server shown in FIG. 3 is an example of one or more of the AI local servers 120 of the AITMS 100. The AI local server 320 can comprise several hardware/software modules to help control features of the AITMS 100.

For example, the AI local server 320 can comprise a sensor module 321. The sensor module can utilize one or more transceivers of the AI local server 320 to communicate with one or more AI Sensors 130 (see FIG. 1). For example, the AI local servers 320 can be in a wired or wireless networked connection with the one or more AI sensors 130. The sensor module 321 is configured to communicate with the AI sensors 130 to receive data from the AI sensors 130 regarding flying vehicles 150 within or within the vicinity of a monitored airspace. The data can include identification information of the flying vehicles 150, flight path information, or the like. The data received by the AI local server 320 can be relayed to the AI cloud server 110, 210.

The AI local server 320 can further comprise a command module 322. The command module 322 can send control instructions to the AI sensors 130 to be relayed to the flying vehicle 150. For example, the control instructions can comprise authorization information, flight path information, and the like. The control instructions can be generated at the AI cloud server 110, 210 and can be relayed by the AI local server 320 to the AI sensors 130. In some examples, the AI local server 320 can generate control instructions to send to the AI sensors 130.

The AI local server 320 can further comprise an AI module 323. The AI module 323 can be configured to generate control instructions based on local events and actions in an airspace or a portion of an airspace. In some instances, a solution cannot be found in the AI module and the AI module can consult with one or more AI cloud servers 110, 210 for a solution to a particular event. In this manner, the AI local server 320 works together with the AI cloud server 110, 210 to control the AITMS 100.

In some examples, the AI module 323 can comprise a machine learning module and a deep learning module that works together with the AI cloud server 110, 210 to create a solution for various events detected by the AI sensors 130. In some examples, results of deep learning and machine learning at the AI cloud server 110, 210 are transmitted to the AI module 323 of the AI local server 320 for implementation in future events.

Figure 4:
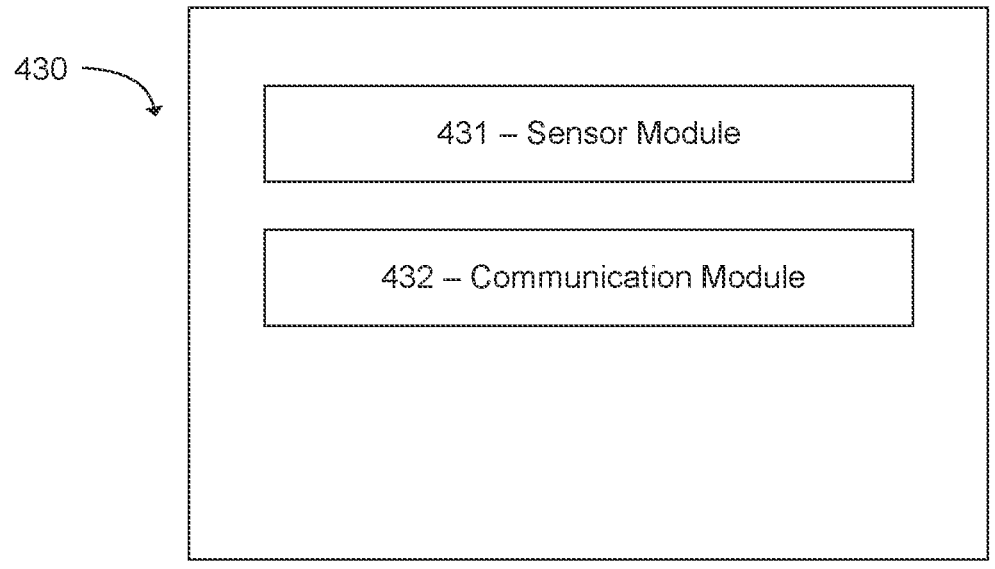
FIG. 4 is a schematic view of an artificially intelligent sensor of the artificially intelligent air traffic management system shown in FIG. 1.

FIG. 4 shows a schematic of an AI sensor, indicated generally as 430. The AI sensor shown FIG. 4 is an example of one or more of the AI sensors 130 of the AITMS 100 shown in FIG. 1. The AI sensor can comprise several hardware/software/firmware modules to help control features of the AITMS 100.

The AI sensor 430 can comprise a sensor module 431. The sensor module 431 can be configured to detect one or more flying vehicles in and around an airspace. The sensor module 431 can employ any variety of sensors such as Wi-Fi or cellular network activity sensors, radar, infrared sensors, radio sensors, and the like. The sensor module 431 can thus calculate a position and trajectory of a flying vehicle in and around an airspace.

The AI sensor 430 can further comprise a communication module 432. The communication module 432 can comprise one or more transceivers to communicate with a flying vehicle 150. The communication module 432 can receive information from the flying vehicle 150 such as identification information, position information, trajectory information, and the like. The communication module 432 can relay such information to the AI local server 120, 320. Further, the communication module 432 can send information to the flying vehicle 150. Such information can include authorization information to enter an airspace (or a denial of authorization), flight path information, or flight control information to control the flying vehicle 150 as it travels through an airspace.

Figure 5:
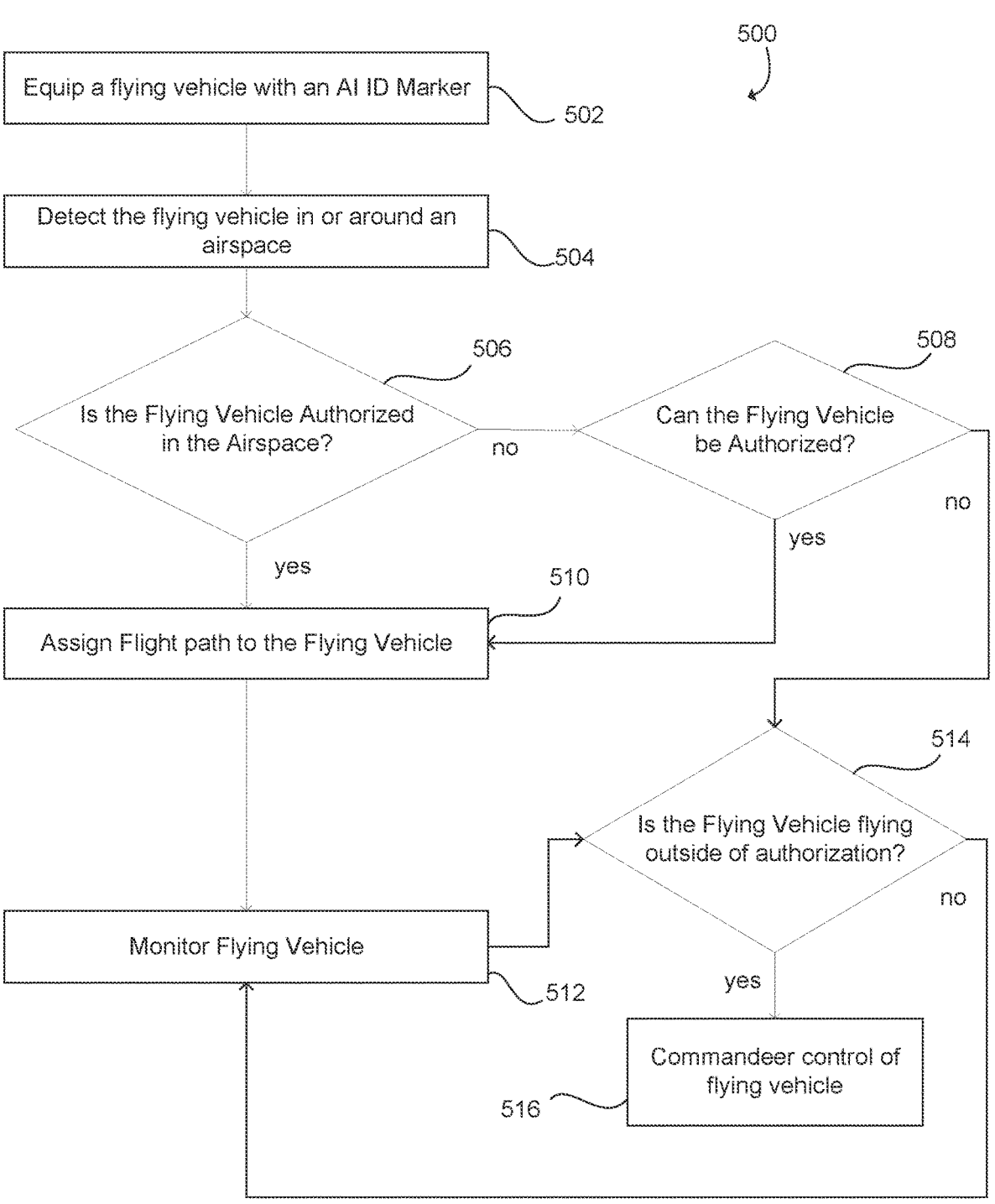
FIG. 5 is an exemplary method of controlling air traffic through an air space.

Other features of the AITMS 100 will be explained in the context of a method for monitoring and controlling an airspace with the AITMS 100. FIG. 5 shows a method of controlling an airspace, indicated generally as 500. The method 500 can first comprise the step of equipping a flying vehicle 150 with an AI identification marker 502. The AI identification marker can be the AI SIM card 140 discussed above. The AI SIM card 140 can provide identification information about the flying vehicle 150 to the AITMS 100 (see FIG. 1). The identification information can include a type of aircraft, an owner of an aircraft, and an authorization status of the flying vehicle 150. In some examples, the AI SIM card 140 can be considered an AI blockchain identification marker. The AI SIM card 140 can comprise a private digital wallet that allows the flying vehicle to fly within an airspace monitored by the AITMS 100. Such a digital wallet may include a unique identifier that bind a hash header associated with a random hexadecimal signature key known as signature values that become bonded when a special encrypted key is developed and delivered to the flying vehicle from the AI local server 120, 320 based on information stored and made accessible to the AI local server 120, 320 in the blockchain node 216 of the AI cloud server 110, 210. The digital wallet can also contain payment information and/or subscription information indicating authorization to fly within an airspace.

In step 504, the AI sensors 130, 430 detect the flying vehicle 150 in or around an airspace. The AI sensors 130, 430 can detect the flying vehicle 150 via a sensor module

431 or through communication with the flying vehicle via a communication module 432. The AI sensor can relay identification information to the AI local server 120, 320 which can in turn relay information to the AI cloud server 110, 210. Based on the identification information, the AITMS 100 can determine whether the flying vehicle is authorized to fly in an airspace in step 506.

For example, the AI sensors 130, 430 can relay information from an AI SIM card 140 of the flying vehicle 150 including digital wallet information regarding payment/subscription information of the flying vehicle 150 for access and use in a given airspace. The AI cloud server can verify the identification information of the AI SIM card 140 of the flying vehicle 150, such as by confirming the identification and payment/subscription information using the hexadecimal signature code. The AI cloud server can then communicate authorization information to the AI sensor 130, 430 to relay to the flying vehicle 150.

If the flying vehicle 150 is not authorized to fly in the airspace, the method 500 proceeds to step 508. In step 508, it is determined whether the flying vehicle can be authorized. For example, the flying vehicle 150 can purchase entry into the airspace or purchase a subscription to fly within the airspace. The entry could be valid for a one time use, for multiple uses, for a given time period such as a day or week, or the like. The entry can be purchased via the e-commerce system 160 which, as mentioned above, can also facilitate transactions in cryptocurrency. That is, the e-commerce system 160 can facilitate a transaction to purchase entry or a subscription to enter the airspace. The results of the transaction can be communicated to the AI cloud servers 110, 210 to update identification information associated with a flying vehicle 150 and/or an AI SIM card 140. If the flying vehicle can be authorized in step 508, or if the flying vehicle was authorized in step 506, the method 500 proceeds to step 510.

In step 510, the flying vehicle 150 is assigned a flight path through the air space. In one example, the AI cloud server 110, 210, and/or the AI local server 120, 320 assign a flight path through an airspace. The flight path can define a virtual "pipeway" through which the flying vehicle 150 is to fly to its destination within or on another side of the airspace. The flight path can be transmitted to the flying vehicle 150 via the AI sensors 130, 430. The flight path can be continually updated in real time based on other inputs from other flying vehicles, environmental inputs and the like. In this manner, the safety of the flying vehicle 150 and other vehicles, people, and property can be ensured as the flying vehicle flies through the airspace.

In some examples, the flight path can be a series of waypoints. A pilot and/or control system of the flying vehicle can then fly the flying vehicle in accordance with the series of waypoints, or within the virtual pipeway through the airspace. In other examples, the flight path can be a series of control instruction sent from the AI sensors to the flying vehicle. In this manner, the flying vehicle 150 can be controlled directly while flying through the airspace. The servers 110, 120 can generate control instructions based on the identification information and deep learning algorithms created based on multiple events and interactions with flying vehicles 150.

In step 512, the flying vehicle is monitored by the AI sensors to ensure that the flying vehicle flies according to the flight path indicated by the AITMS 100. For example, the AI sensors 130, 430 continually monitor a position of the flying vehicle 150 to ensure that the flying vehicle 150 is within virtual pipeway according to the flight path. In another example, the flying vehicle 150 bonds its hexadecimal signature code through the AI sensors, which is verified via the AI cloud server 110, 210 and the AI local server 120 320. In real-time, these signatures codes allow for a secure failsafe virtual flight paths that stage the different types of flying vehicles that are in flight within the airspace monitored by the AITMS 100. The method then proceeds to step 514.

Returning to step 508, if the flying vehicle cannot be authorized, the lack of authorization is communicated to the flying vehicle and the method 500 proceeds to step 514. In step 514, it is determined whether the flying vehicle 150 is flying outside of its authorization. For example, if the flying vehicle 150 was denied authorization into an airspace, the AI sensors 130, 430 monitor the flying vehicle 150 to determine whether the flying vehicle 150 enters the airspace. In the case of a flying vehicle already flying within a virtual pipeway in the airspace, the AI sensors 130, 430 monitor the flying vehicle to determine whether the flying vehicle leaves the virtual pipeway. If in step 514 it is determined that the flying vehicle 150 is not flying outside of authorization, the method 500 proceeds back to step 512. If the vehicle is determined to be flying outside of authorization, the method 500 proceeds to step 516.

In step 516, the AITMS 100 commandeers control of the flying vehicle to prevent unauthorized travel through the airspace. Other defense operations can also be used to prevent the unauthorized travel through an airspace. Such defense methods are set forth in U.S. Pat. No. 11,022,407, the contents of which are hereby incorporated by reference in their entirety. The AI sensors 130, 430, based on control instructions received from the AI local server 120, 320, can commandeer control of the flying vehicle 150 to control the vehicle out of the airspace, to put down the vehicle in a detention holding area, or to turn over the vehicle to policing authorities.

For example, when a flying vehicle does not follow flight protocols according to the flight path set by the AITMS 100 for the flying vehicle, or if the vehicle does not follow other relevant regulations such federal, state, or local regulations in a given airspace, the AITMS 100 can take temporary correctional controls of the flying vehicle to adjust course and aid it back into the flight path or virtual pipeway. If the flying vehicle 150 continues to deviate from the flight path and applicable rules, the AITMS 100 can commandeer the flying vehicle to take extended control of the flying vehicle until it reaches its final destination through a virtual pipeway. If the flying vehicle does not respond to the previous efforts, the flying vehicle can be commandeered and guided on a path to be captured and controlled by law enforcement. If the AITMS 100 is unable to commandeer the flying vehicle 150, the AITMS 100 can send control instructions to remaining vehicles to shut down the airspace to all non-law-enforcement vehicles to allow law enforcement to neutralize the threat of the flying vehicle.

In this manner, the AITMS 100 and method of controlling flying vehicles through an airspace can safely direct multiple flying vehicles through the airspace. The system and method set forth herein can manage the traffic of any number of flying vehicles such as drones, autonomous flying vehicle delivery drones, autonomous flying medical vehicles, flying taxis, heavy transport drones, flying cars, flying trucks, flying passenger drones, aerial robots, next generation private aircraft, next generation commercial aircraft, and legacy aircraft.

All these types of aerial vehicles will be commanded and controlled by the AITMS 100 such as within "smart cities"

and non-smart cities. The system can run in real-time using virtual pipeways containing lanes. The vehicles travelling through the pipeways can be controlled via the AI Sensors 130, 430 at multiple levels, multiple altitudes, multiple waypoints. This allows for AITMS 100 to aid in commanding and controlling shared airspace at multiple altitudes and at multiple times. The AITMS can utilize artificial intelligence technologies and a blockchain platform using command and control protocols that direct the traffic management process in constant communication protocols that are transmitted between the AI sensors 130, 430, the AI Cloud Servers 110, 210, and the AI local servers 120, 320.

The AITMS 100 can solve issues in controlling and managing thousands to millions of flying vehicles at the same time without the occurrence of hostile attacks, collisions, and traffic delays. The AITMS 100 enables the managing of a unique and constantly varying range of flying vehicles sharing the same airspace and can monitor flying vehicles outside of the airspace, such as up to a 100-mile radius outside of the airspace or more.

In some examples, the AITMS 100 can be configured with multiple AI sensors 130, 430. An AI local server 120, 320 can be in communication with one or more of the AI sensors. In this manner, the AI local server 120, 320 can be responsible for AI sensors and air traffic in a portion of the airspace. For example, an AI local server 120, 320 can be responsible for AI sensors and air traffic in a particular neighborhood or city within the airspace. Other AI local servers 120, 320 and AI sensors 130, 430 can be configured in other neighborhoods or cities within the airspace. As a flying vehicle 150 moves through the airspace, the flying vehicle 150 can constantly transmit identification such as from a digital wallet of the AI SIM card 140 which is then verified at the different AI local servers in each of the neighborhoods or cities registered on the AI cloud servers' blockchain registries.

The AITMS 100 facilitates the ability to create several defensive solutions in protecting the airspace from dangerous activities. The defense is created to defend against weaponized drones or other weaponized flying vehicles that threaten or attack any type of people or property affecting the safety of the flying vehicles or the inhabitants within the within or around the airspace. The defense system can be a separate third-party defense system or one customized within the AITMS 100. The defense system, whether integrated with the AITMS 100 or separate therefrom, can be in constant communications with the AI sensors 130, 430 to create solutions to occurring events that failed to pass authentication, or with flying vehicles that have missing identification information, such as a missing AI SIM card 140.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An artificially intelligent ("AI") air traffic control system comprising:
    an AI sensor configured to detect and remotely communicate with one or more flying vehicles;
    an AI local server communicatively coupled to the AI sensor, the AI local server sending control instructions comprising authorization for the one or more flying vehicles to fly in an airspace monitored by the AI air traffic control system and a flight path assigned to the one or more flying vehicles to fly through the airspace; and AI cloud servers communicatively coupled to the AI local server, the AI cloud servers configured to receive data from the AI local server and the AI sensor associated with the one or more flying vehicles, the AI cloud servers comprising a decentralized network wherein each AI cloud server of the AI cloud servers comprises a blockchain node comprising a registry of public identification information associated with the one or more flying vehicles;

an AI SIM card assigned to each of the one or more flying vehicles, the AI SIM card comprising private identification information corresponding to the assigned flying vehicle;

wherein the AI local server sends the authorization and the flight path to the one or more flying vehicles via the AI sensor based on the received data stored on the AI cloud server, and wherein the private identification information comprises a digital wallet having a unique identifier that binds a hash header associated with a random hexadecimal signature key, wherein the private identification information is verified based on a public key associated with the public identification information, and wherein authorization is based on the verification of the private identification information with the public identification information.

2. They-system of claim 1, wherein the AI local server is operable to perform the verification based on the public identification information stored on the registry.

3. The system of claim 1 wherein the registry of public identification information associated with the one or more flying vehicles is accessible by the AI local server.

4. The system of claim 1, further comprising an e-commerce system operable to facilitate a transaction with the one or flying vehicles to obtain the authorization to fly in the airspace.

5. The system of claim 1, wherein the AI sensor comprises a sensor module comprising a Wi-Fi network activity sensor, radar, infrared sensor, or a radio sensor to detect the one or more flying vehicles in or around the airspace.

6. The system of claim 5, wherein the AI sensor comprises a communication module operable to send control instructions to the one or more flying vehicles to assume control the one or more flying vehicles as the one or more flying vehicles fly through the airspace.

7. A method for controlling an airspace, the method comprising:

detecting a flying vehicle in or around an airspace via an artificially intelligent ("AI") sensor including detecting identification information associated with the flying vehicle;

communicating the identification information to an AI local server communicatively coupled to the AI sensor;

determining an authorization status of the flying vehicle at the AI local server based on data stored at an AI cloud server associated with the flying vehicle, the AI local server being communicatively coupled to the AI cloud server;

when an authorization status of the flying vehicle is determined to be unauthorized, assigning a flight path through an air space to the flying vehicle at the AI local server and communicating the flight path to the flying vehicle via the AI sensor; and when the authorization status of the flying vehicle is determined to be unauthorized, restricting access of the flying vehicle to the air space, wherein the AI cloud server is one of a plurality of AI cloud servers, the AI cloud servers comprising a decentralized network wherein each AI cloud server comprises a blockchain node, and the data stored at the AI cloud server comprises a registry of public identification information associated with the flying vehicle, wherein an AI SIM card is assigned to flying vehicle, the AI SIM card comprising private identification information corresponding to the assigned flying vehicle, and wherein the private identification information comprises a digital wallet having a unique identifier that binds a hash header associated with a random hexadecimal signature key, wherein the private identification information is verified based on a public key associated with the public identification information, and wherein the authorization status is based on the verification of the private identification information with the public identification information.

8. The method of claim 7, wherein the flight path comprises a series of waypoints through the airspace.

9. The method of claim 7, wherein assigning a flight path comprises sending control instructions from the AI sensor to control the flying vehicle as it travels through the airspace.

10. The method of claim 7, wherein when the authorization status is determined to be unauthorized, conducting a transaction with the flying vehicle via an e-commerce system to authorize the flying vehicle to fly through the airspace.

11. The method of claim 7, wherein when the authorization status is determined to be unauthorized, commandeering control of the flying vehicle via control instructions sent by the AI sensor.

12. The method of claim 11, wherein the flying vehicle is automatically piloted to a holding area.

13. They-method of claim 7, wherein the AI local server is operable to perform the verification based on the public identification information stored on the registry.

14. The method of claim 7, wherein the registry of public identification information associated with the one or more flying vehicles is accessible by the AI local server.

* * * * *